United States Patent
Deguchi et al.

(10) Patent No.: US 6,317,397 B1
(45) Date of Patent: Nov. 13, 2001

(54) DATA RECORDING MEDIUM, DATA RECORDING APPARATUS, DATA REPRODUCING APPARATUS AND METHOD

(75) Inventors: Hironori Deguchi, Kadoma; Takashi Ishida, Yawata; Naoya Matsuoka, Isehara, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/193,129

(22) Filed: Nov. 17, 1998

(30) Foreign Application Priority Data

Nov. 17, 1997 (JP) .................................................. 9-314939

(51) Int. Cl.[7] ........................................................ G11B 5/09
(52) U.S. Cl. ................................. 369/47.19; 369/59.24; 369/59.25; 369/275.3
(58) Field of Search ............................. 369/47.15, 47.19, 369/47.17, 53.31, 53.33, 53.35, 53.36, 59.21, 59.23, 59.24, 59.25, 124.04, 124.07, 275.3; 360/32, 48, 29

(56) References Cited

U.S. PATENT DOCUMENTS 5,732,056 * 3/1998 Yanagi ............................. 369/59.19
6,097,695 * 8/2000 Kobayashi ........................ 369/275.4

FOREIGN PATENT DOCUMENTS 9-282668   10/1997   (JP) .
97/22182    6/1997   (WO) .

* cited by examiner

*Primary Examiner*—Paul W. Huber
(74) *Attorney, Agent, or Firm*—Wenderoth, Lind & Ponack, L.L.P.

(57) ABSTRACT

A data recording medium suitable for an optical disk such as DVD is disclosed. The data recording medium has a plurality of sectors. The sector comprises a header area to store address information of the sector, a gap area for power calibration of a laser beam used for data recording, a data recording area to store a plurality of modulated codes obtained by modulating the data, a postamble area located immediately after the data recording area, and a buffer area to separate sectors. The modulated code includes information to demodulate a modulated code located immediately before the each modulated code. The postamble area stores information to demodulate the final demodulated code in the data recording area. Data pattern stored in the postamble area includes synchronization pattern, is determined based on DSV of the data pattern, or satisfies the run length limitation.

20 Claims, 12 Drawing Sheets

Fig.2A

MAIN CONVERSION TABLE (DATA SYMBOLS)

| DATA SYMBOL | STATE1 CODE WORD | STATE1 NEXT STATE | STATE2 CODE WORD | STATE2 NEXT STATE | STATE3 CODE WORD | STATE3 NEXT STATE | STATE4 CODE WORD | STATE4 NEXT STATE |
|---|---|---|---|---|---|---|---|---|
| 0 | 0010000000001001 | 1 | 0100000100100000 | 2 | 0010000000001001 | 1 | 0100000100100000 | 2 |
| 1 | 0010000000010010 | 1 | 0100000000010010 | 1 | 1000000100100000 | 3 | 1000000100100000 | 3 |
| 2 | 0010000100100000 | 2 | 0010000100100000 | 2 | 1000000000010010 | 1 | 1000000000010010 | 1 |
| ... | ... | ... | ... | ... | ... | ... | ... | ... |

Fig.2B

SUB CONVERSION TABLE (DATA SYMBOLS)

| DATA SYMBOL | STATE1 CODE WORD | STATE1 NEXT STATE | STATE2 CODE WORD | STATE2 NEXT STATE | STATE3 CODE WORD | STATE3 NEXT STATE | STATE4 CODE WORD | STATE4 NEXT STATE |
|---|---|---|---|---|---|---|---|---|
| 0 | 0000010010000000 | 4 | 0000010010000000 | 4 | 0100100001001000 | 2 | 0100100001001000 | 2 |
| 1 | 0000100100000000 | 4 | 0000100100000000 | 4 | 0100100010001000 | 3 | 0100100010001000 | 3 |
| 2 | 0001001000000000 | 4 | 0001001000000000 | 4 | 0100100000001001 | 1 | 0100100000001001 | 1 |
| ... | ... | ... | ... | ... | ... | ... | ... | ... |

▲ STATE INFORMATION BIT

*Fig.3A*

| FRAME NO. | SYNC NO. |
|---|---|
| 1 | SY0 |
| 2 | SY5 |
| 3 | SY1 |
| 4 | SY5 |
| 5 | SY2 |
| 6 | SY5 |
| 7 | SY3 |
| 8 | SY5 |
| 9 | SY4 |
| 10 | SY5 |
| 11 | SY1 |
| 12 | SY6 |
| 13 | SY2 |
| 14 | SY6 |
| 15 | SY3 |
| 16 | SY6 |
| 17 | SY4 |
| 18 | SY6 |
| 19 | SY1 |
| 20 | SY7 |
| 21 | SY2 |
| 22 | SY7 |
| 23 | SY3 |
| 24 | SY7 |
| 25 | SY4 |
| 26 | SY7 |

*Fig.3B* — MAIN CONVERSION TABLE (SYNC CODES)

*Fig.3C* — SUB CONVERSION TABLE (SYNC CODES)

Fig.5

| | POSTAMBLE PATTERN | |
|---|---|---|
| | STATE1/STATE2 | STATE3/STATE4 |
| MAIN CONVERSION TABLE | 0 0 0 1 0 0 1 0 0 1 0 0 0 1 0 0 | 1 0 0 1 0 0 1 0 0 0 0 0 0 1 0 0 |
| SUB CONVERSION TABLE | 0 0 0 1 0 0 1 0 0 0 0 0 0 1 0 0 | 1 0 0 1 0 0 1 0 0 1 0 0 0 1 0 0 |

▲ STATE INFORMATION BIT

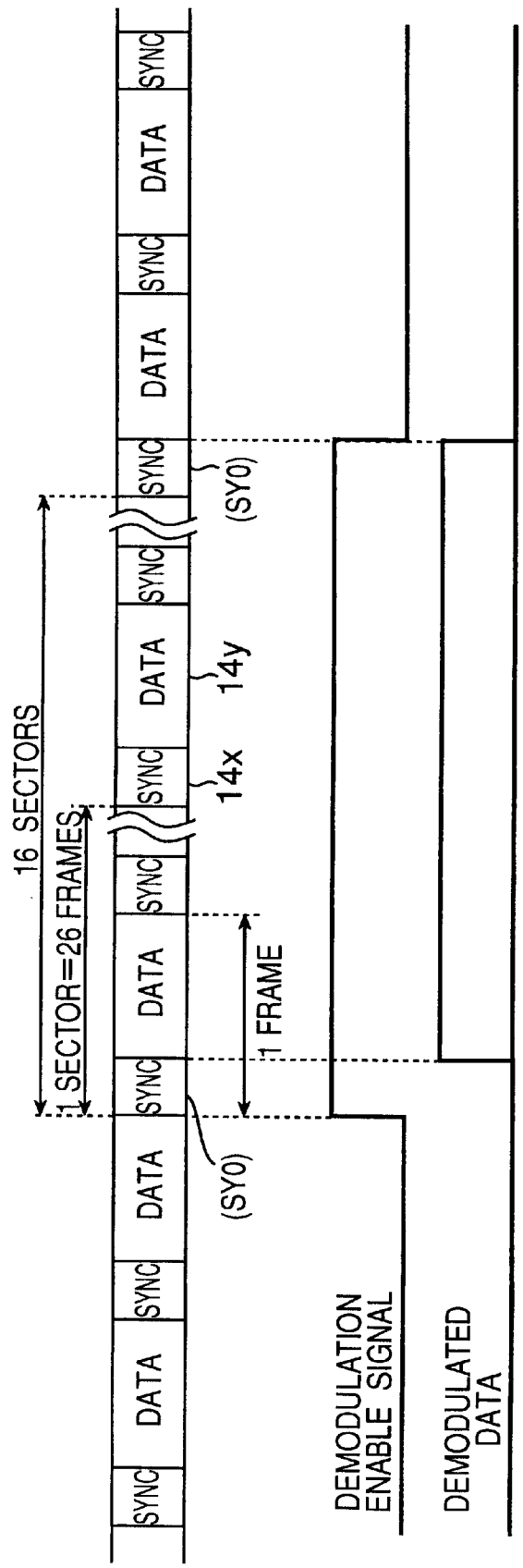

DATA RECORDING MEDIUM, DATA RECORDING APPARATUS, DATA REPRODUCING APPARATUS AND METHOD

BACK GROUND OF THE INVENTION

1. (Field of the Invention)

This invention relates to data recording medium for which digital data is recorded or reproduced with a laser beam, more particularly data recording medium suitable for an optical disk for recording and reproducing digital data. This invention further relates to apparatus and method for recording or reproducing digital data for such a data recording medium.

2. (Description of the Prior Art)

Various kinds of optical disk have been developed in recent years as digital recording media for recording and reproducing large volumes of data. One of these is the DVD-ROM that employs 8–16 modulation.

The 8–16 modulation adopted in the DVD-ROM converts an 8-bit data symbol to a 16-bit code word. A plurality of code words corresponds to one data symbol. Which one of code words is selected is decided with reference to the DSV (Digital Sum Value) and the state information designated for each code word. The DSV is obtained by adding +1 for the positive side and −1 for the negative side of the NRZI converted signal of the modulated code. The DSV determined for each code word is called the CDS (Code Word Digital Sum) The code word is selected with reference to the DSV for code word after the code word to be currently selected. The DSV is calculated cumulatively to from the first data symbol to the data symbol just before the data symbol to be converted currently and is referenced to select the code word. Demodulation is performed by converting the 16 bits of the current code word into an 8-bit data symbol with reference to the 2 bits of the state information bits of the next code word.

FIG. 12 shows a sector format employed in DVD-ROM. In FIG. 12, a data area 14y is an area in which data is recorded and a sync area 14x is an area including synchronization information to be used for reading out data from the data area 14y. A pair of the sync area 14x and the data area 14y composes a frame, and 26 frames composes one sector. The sync area 14x and the data area 14y are formed continually.

In this format, the latest data symbol recorded on the data area is demodulated with reference to the state information bits included in sync area immediately after that data area.

Now, for a DVD which is capable of recording, the aforementioned format is not applied. Such a DVD needs some other areas, for example, an area for sector identification and an area for laser power calibration for data recording, other than the area on which data is recorded (ex. sync area and data area). Therefore, the area on which data is recorded is not continuous every sector, then the final data area in the sector is not followed by the sync area. Accordingly, the state information required for demodulation of the final code word in the last data area of the sector can not be obtained.

Therefore, A conventional apparatus for reproducing data from a DVD with the conventional format shown in FIG. 12 can not reproduce data from a DVD with the format capable of recording described above.

SUMMARY OF THE INVENTION

An object of the present invention, which is devised for the purpose of resolving the problems stated above, is to provide a data recording medium capable of recording digital data, more particularly a data recording medium suitable for an optical disk.

Further object of the present invention is to provide an apparatus and a method for data recording or reproducing with the data recording medium.

In a first aspect of the invention, A data recording medium having a region for recording data is provided. The region has a plurality of sectors. Each sector comprises a recording area and a postamble area. The data recording area stores a plurality of modulated codes obtained by modulating the data. The postamble area is located immediately after the data recording area and stores a data pattern which includes synchronization information to be used for synchronizing. The data pattern in the postamble area may be determined from a predetermined plurality of patterns based on a DSV calculated for the pattern accompanied with data stored in the recording area so that DSV be comes smaller. The data pattern may also be determined to satisfy a run length limitation. The data pattern in the postamble area may also include information to demodulate the final modulated code in the data area.

In a second aspect of the invention, an apparatus is provided for recording data in the form of modulated data to a data recording medium. The data recording medium has a region for recording data. The region has a plurality of sectors. Each sector includes a data recording are a to store modulated codes obtained by modulating the data. The data recording apparatus comprises a pattern generator and a recording unit. The pattern generator generates at least one data pattern including synchronization pattern to be used for synchronizing. The data pattern may also include information to demodulate the final modulated code stored in the data recording area. The data pattern may be determined from a predetermined plurality of patterns based on a DSV calculated for the pattern so that DSV becomes smaller. The data pattern may be determined to satisfy a run length limitation. The recording unit records one of the data patterns from the pattern generator in the area immediately after the data recording area.

In a third aspect of the invention, an apparatus is provided for reproducing data from a data recording medium. The data recording medium has a region for recording data. The region has a plurality of sectors. Each of the sectors includes a data recording area and a postamble area located immediately after the data recording area. The data recording area includes a sync area storing synchronization pattern to be used for synchronizing and a data area storing modulated data obtained by modulating the data. The postamble area stores a data pattern including a part of the synchronization pattern. The data reproducing apparatus comprises a reproducing unit, an area detector and a demodulator. The reproducing unit reads out data from the recording medium in the form of analog modulated signal, and converts the analog modulated signal into digital data. The area detector detects said sync area and the data area based on said digital data, and generates a predetermined control signal while the sync area and the data area are detected. The demodulator demodulates the digital data form the reproducing unit while the area detector generates the control signal.

In a fourth aspect of the invention, a method is provided for recording data in the form of modulated codes to a data recording medium. The data recording medium has a region to record data. The region has a plurality of sectors. Each of the sectors includes a data recording area to store the modulated codes obtained by modulating the data. The data recording method comprises generating at least one data pattern including at least a part of synchronization pattern to be used for synchronizing, and recording one of the generated data patterns in the area immediately after the data recording area.

In a fifth aspect of the invention, a method is provided for reproducing data from a data recording medium. The data recording medium has a region for recording data. The region has a plurality of sectors. Each of the sectors includes a data recording area and a postamble area located immediately after the data recording area. The data recording area includes a sync area storing synchronization pattern to be used for synchronizing and a data area storing modulated data obtained by modulating the data. The postamble area stores a data pattern including a part of the synchronization pattern. The data reproducing method comprises reading out data from said recording medium in the form of analog modulated signal, converting said analog modulated signal into digital data, detecting said sync area and the data area based on the digital data, generating a predetermined control signal while the sync area and the data area are detected, and demodulating the digital data while the control signal is being generated.

BRIEF DESCRIPTION OF THE DRAWINGS

A better understanding of the invention will be obtained by reading the description of the invention below, with reference to the following drawings.

FIG. 2A is a main conversion table for 8–16 modulation in the data area.

FIG. 2B is a sub conversion table for 8–16 modulation in the data area.

FIG. 3A is a table showing the relation of the frame number to the sync number.

FIG. 3B is a main conversion table for 8–16 modulation in the sync area.

FIG. 3C is a sub conversion table for 8–16 modulation in the sync area.

FIG. 5 is a conversion table for 8–16 modulation in the postamble area.

FIG. 11 is a diagram for explaining of the sector structure of the second sector format for the optical disk apparatus in the third embodiment of the present invention, a timing chart of the demodulation enable signal and a timing chart of the demodulated data.

DESCRIPTION OF THE PREFERRED EMBODIMENTS

Figure 1:
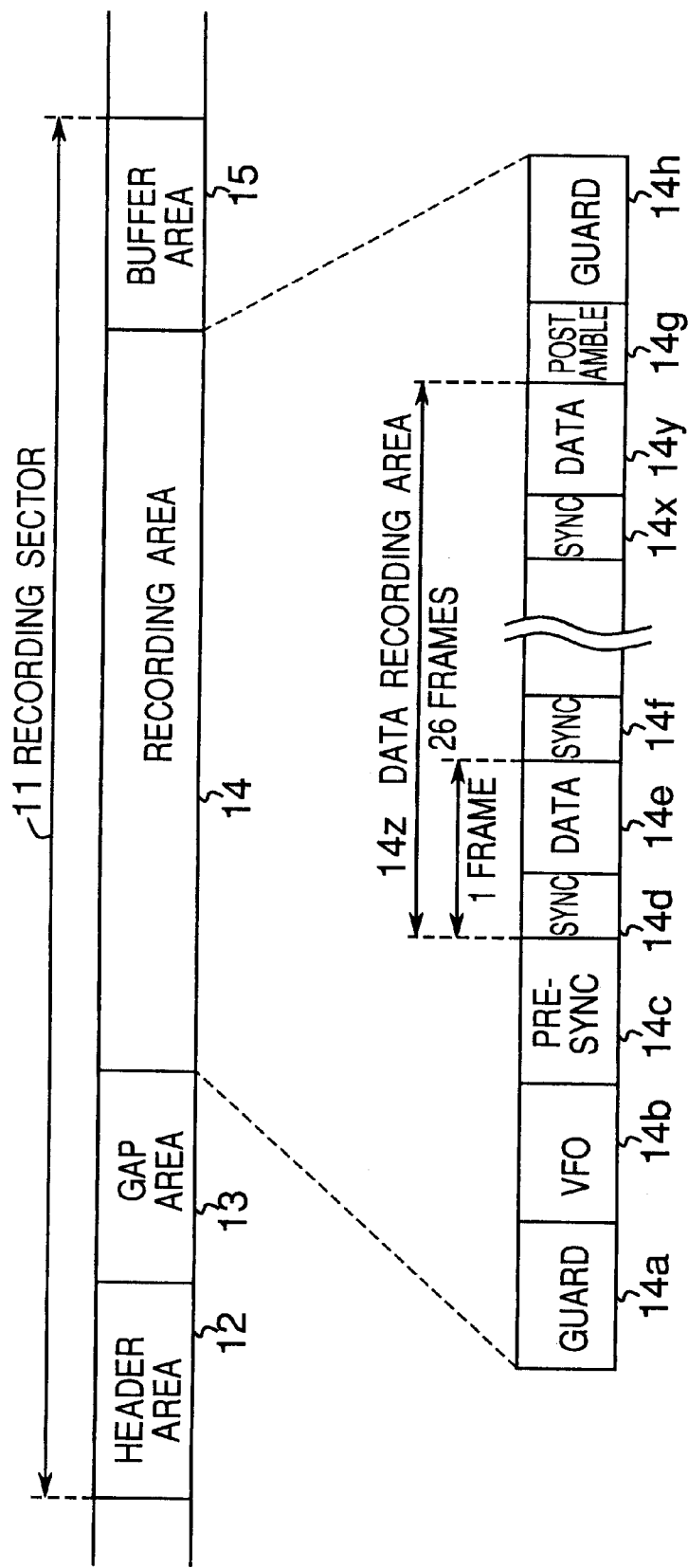
FIG. 1 is a diagram of the sector structure in an optical disk in a first embodiment of the present invention.

Preferred embodiments of the present invention will be described below with reference to the drawings. Like reference numerals designate identical or corresponding parts throughout the drawings.

(First Embodiment)

FIG. 1 is a diagram that represents the recording sector format in an optical disk in the first embodiment of the present invention. It is noted that the recording sector format shown in FIG. 1 is one example, and the present invention can apply to any sector formats in which a sector has a header area for sector identification and a buffer area for separating sector other than a data recording area for recording data and therefore the data recording area is discontinuous among sectors. It is also noted that data recording and data reproducing for the optical disk are performed by using a laser beam.

In FIG. 1, a recording sector 11 comprises a header area 12, a gap area 13, a recording area 14 and a buffer area 15, in that order.

In the header area 12, address information of the sector to identify the sector is recorded in advance. The gap area 13 is not used for data recording, but is provided to prevent overwriting in the header area 12 due to turning jitter of an optical disk, and also to calibrate the laser emission power at data recording on the recording area 14.

The recording area 14 is an area on which data to be processed by the user is recorded. The buffer area 15 is provided to permit complete separation of the adjacent sectors even when turning jitter of the optical disk is encountered.

The recording area 14 comprises a front guard area 14a, a VFO area 14b, a pre-sync area 14c, a data recording area 14z, a postamble area 14g and a back guard area 14h.

The guard areas 14a and 14h are used to protect the VFO area 14b and the data area 14h from medium degradation due to repeated recording. The guard areas 14a and 14h may, for example, stores the same data pattern as the VFO area 14b.

The VFO area 14b is used to implement bit synchronization, and stores a single data pattern which is easily extracted by a clock. For example, the data pattern is obtained from the NRZI conversion of "1100010001000 . . .".

The pre-sync area 14c is used for determining the beginning of the data recording area 14z. The pre-sync area 14c stores a data pattern which has adequate resistance against flaws and of which the self-correlation function has a sharp peak. The data pattern is, for example, obtained from the NRZI conversion of "000001000100100000100001001000001000001000010000".

The data recording area 14z comprises a plurality of the sync area 14d, 14f and 14x, and a plurality of the data area 14e and 14y. A pair of a sync area and a data area composes a frame. Each frame has respectively a frame number from 1 to 26 according to the order of the frame. The data recording area 14z consists of twenty-six frames.

The data area 14e and 14y store data that are obtained from the NRZI conversion of the code words (modulated codes) which are the result of 8–16 modulation of data symbols. The sync areas 14d, 14f and 14x store data that are synchronization data to take synchronization on data reading from data area 14e and 14y immediately after the sync areas 14d, 14f and 14x.

The process of 8–16 modulation in the sync area and the data area is described below. It is noted that the detail of 8–16 modulation is disclosed in International Publication No. WO 97/22182 ("A DIGITAL MODULATION APPARATUS, A DIGITAL MODULATION METHOD, AND RECODING MEDIUM THEREFOR", by Tanaka et al.).

First, the process of the 8–16 modulation in the data area 14e and 14y is described.

FIGS. 2A and 2B show a main conversion table and a sub conversion table for the 8–16 modulation in the data area 14e and 14y, respectively. These tables are used for the 8–16 modulation in the data area 14e and 14y.

As shown in FIGS. 2A and 2B, each conversion table has a table that is categorized into four states (state1 to state4). Every table contains, together with the code words, the state information that indicates the state (the next state) to be selected when the next data symbol is converted, in order to keep the run length limitation at the code word connections and to designate the state information bits used on the demodulation. In the sub conversion table, some code words may be out of the run length limitation. The run length limitation is to constrain a number of bit "0" between bits "1" so that the number of bit "0" is not less than the minimum inverted bit interval $T_{min}$ and is not more than the maximum inverted bit interval $T_{max}$.

Each code word contains the state in formation bits indicating the state of the conversion table used just before. The state information bits are referenced on data demodulation, and consist of a first bit and a thirteenth bit in FIGS. 2A and 2B, for example. For state1 or state4, the state information bits are "00", "01", "10" or "11". In this case, the state information bits are treated as "don't care". For state2, the state information bits are "00". For state3, the state information bits are "01", "10" or "11". As shown in FIGS. 2A and 2B, the table is constructed so that the code word with which the next state is 1 or 4 has only one corresponding data symbol, and the data symbol can be determined specifically without reference to the state information bits. The code word with which the next state is 2 or 3 may have a plurality of corresponding data symbols. That is, the code word (16 bits) and the information bits (2 bits) included in the next code word can specify (demodulate) the data symbol (8 bits).

Next, the process of the 8–16 modulation in the sync area 14d, 14f and 14x is described.

FIGS. 3B and 3C show a main conversion table and a sub conversion table for the 8–16 modulation in the sync area 14d, 14f and 14x, respectively. These tables are used for the 8–16 modulation in the sync area 14d, 14f and 14x.

The sync code is selected with reference to a sync number corresponding to the frame number shown in FIG. 3A. The main conversion table shown in FIG. 3B and the sub conversion table shown in FIG. 3C are categorized into two tables, i.e. one is for state1 or state2 and the other is for state3 or state4. Therefore, a common table is used for state1 and state2, and as well a common table is used for state3 and state4. It is noted that the state of the final code word in the data area 14e and 14y following the sync area 14d, 14f and 14x, i.e. the next state of the sync area, is always 1.

As shown FIGS. 3B and 3C, the sync code contains the state information bits to be referenced when the code word modulated just before the sync code is demodulated. Concretely, the state information bits consist of a first bit and a thirteenth bit in FIGS. 3B and 3C as well as the data area. For state1 or state2, the state information bits are "00". For state3 or state4, the state information bits are "10". The relation between the state and the state information bits in the sync area implements the relation between them in the data area.

In the 8–16 modulation for the data recording area, the main conversion table and the sub conversion table are used alternatively in order to suppress the DC component of NRZI signal obtained by NRZI conversion.

Figure 4:
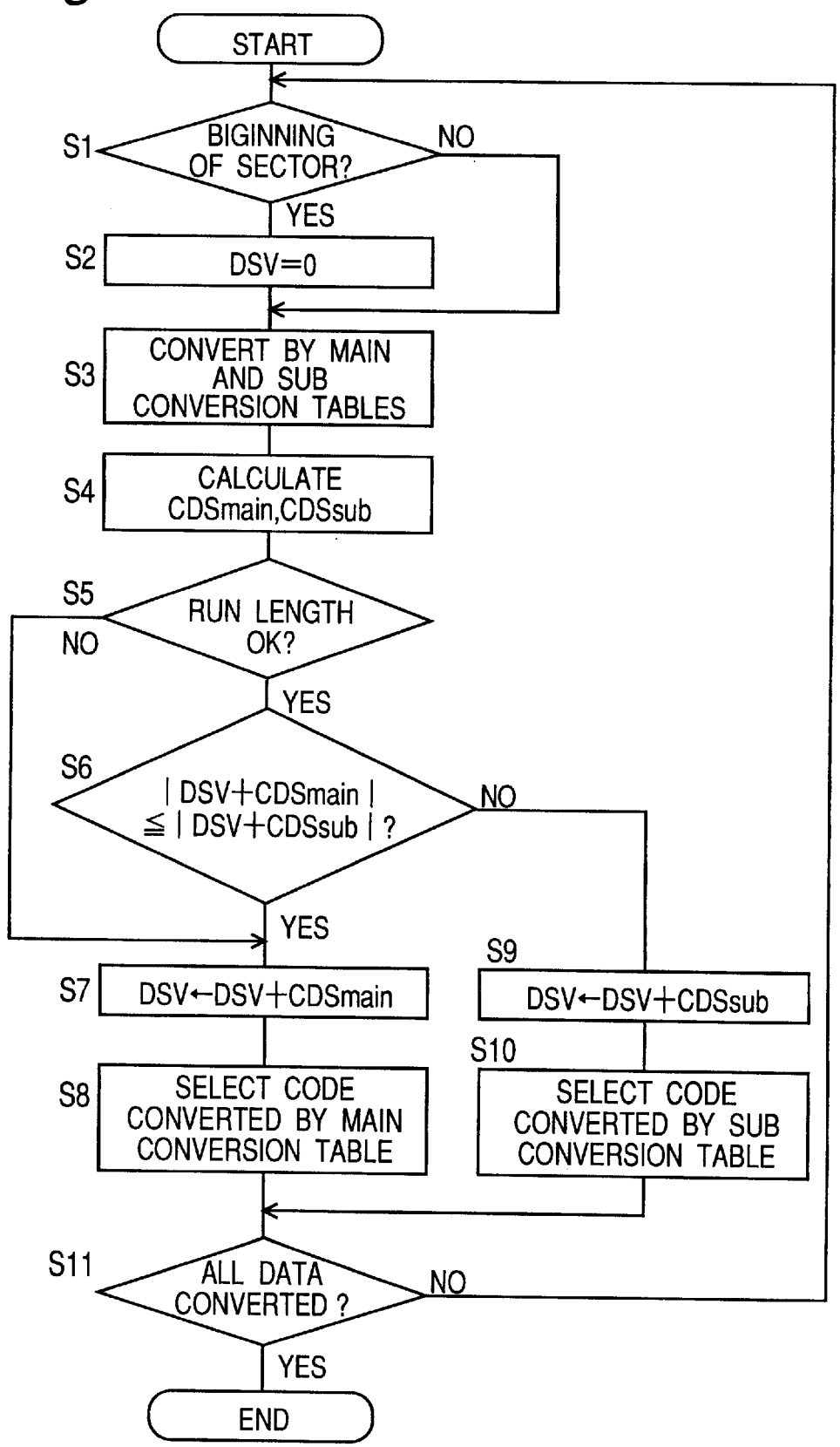
FIG. 4 is a flowchart for DC component suppress control for 8–16 modulation in the data recording area (the sync area and the data area).

The DC component suppress process for the 8–16 modulation in the data recording area 14z (i.e. the sync area 14d, 14f and 14x, and the data area 14e and 14y) is described below with reference to a flowchart shown in FIG. 4.

First, it is decided whether or not the area to be processed from now on is a beginning of the sector (S1). When the area is the beginning of the sector, the value of DSV is initialized to zero (S2). In this embodiment, since the values of CDS (DSV calculated for each code word) for the guard area 14a, the VFO area 14b and the pre-sync area 14c are zero, the value of DSV can be initialized to zero at any one of the guard area 14a, the VFO area 14b and the pre-sync area 14c.

Then, the sync code to be recorded in the sync area 14d, 14f or 14x, or the code word to be recorded in the data area 14e or 14y is converted by using respectively the main tables and the sub tables (S3). That is, when the current conversion process is performed for the sync area 14d, 14f or 14x shown in FIG. 1, the sync number corresponding to the frame number shown in FIG. 3A is converted to the sync code by using respectively the main conversion table shown in FIG. 3B and the sub conversion table shown in FIG. 3C. Otherwise, when the current conversion process is performed for the data area 14e or 14y shown in FIG. 1, the data symbol is converted to the code word by using respectively the main conversion table shown in FIG. 2A and the sub conversion table shown in FIG. 2B. In both cases, the state of the table to be used for conversion is decided based on the next state which is determined on the conversion of the immediately before code word.

After that, the value of $CDS_{main}$ and the value of $CDS_{sub}$ are respectively calculated (S4). The $CDS_{main}$ is calculated by the result of the NRZI conversion of the sync code, or the code word, converted with the main conversion table. The $CDS_{sub}$ is calculated by the result of the NRZI conversion of the sync code, or the code word, converted with the sub conversion table.

Subsequently, the run length is calculated at the connection where the current sync code, or the current code word, converted by the sub conversion table is connected to the immediately before sync code, or the immediately before code word. Then, it is decided whether or not the calculated run length at the connection satisfies the run length limitation (S5). When the run length is out of the run length limitation ("NO" in step S5), step S6 is skipped, otherwise ("YES" in step S5), step S6 is executed. Thus, the run length is decided for the sync code or the code word converted with the sub conversion table because the sync code or the code word converted with the sub conversion table may be out of the run length rule. When the run length limitation is not satisfied, the conversion is performed with the main conversion table. Accordingly, the demodulated codes which satisfy the run length limitation can always be obtained for the 8–16 modulation.

In step S6, the absolute value of the value obtained by adding the $CDS_{main}$ to the current DSV (i.e. the cumulative value of the DSV for the area from the beginning of the sector to the immediately before processed area in the sector) is compared with the absolute value of the value obtained by adding the $CDS_{sub}$ to the current DSV. When the absolute value obtained by adding the CDS main to the current DSV is not more than the absolute value obtained by adding the $CDS_{sub}$ to the current DSV ("YES" in step S6), step S7 is executed, otherwise ("NO" in step S6), step S9 is executed.

In step S7, the value obtained by adding the $CDS_{main}$ to the current DSV replaces the value of the current DSV, which results in new DSV. After that, the sync code or the code word converted by the main conversion table is selected (S8).

In step S9, the value obtained by adding the $CDS_{sub}$ to the current DSV replaces the value of the current DSV, which results in new DSV. After that, the sync code or the code word converted by the sub conversion table is selected (S10).

Then, it is decided whether or not all data to be recorded in the sector, i.e. data for twenty-six frames, are completely processed (S11), while the aforementioned processes are repeatedly executed until all data to be recorded in the sector are completely processed.

Thus, in this embodiment, the main conversion table or the sub conversion table is alternatively selected so that the absolute value of DSV becomes smaller in order to suppress the DC component of NRZI signal.

The postamble area 14g is described below.

FIG. 5 shows the conversion table for a data pattern to be recorded on the postamble area 14g (it is referred to as "postamble pattern" below). The postamble pattern is a same pattern as 16 bits at the front of the leadoff sync code SYO shown in FIGS. 3B and 3C. Herewith, the postamble pattern can contain the state information bits as well as the sync code with sync number SYO as shown in FIG. 5. A manner for selecting one of four postamble patterns is the same as the manner in the sync area or the data area. That is, state1/state2 or state3/state4 is selected based on the next code of the immediately before code word, and then the postamble pattern is determined by using either one of the main conversion table or the sub conversion table, where the used one is a table that has a smaller DSV value which is calculated cumulatively from the beginning of the sector.

Figure 6:
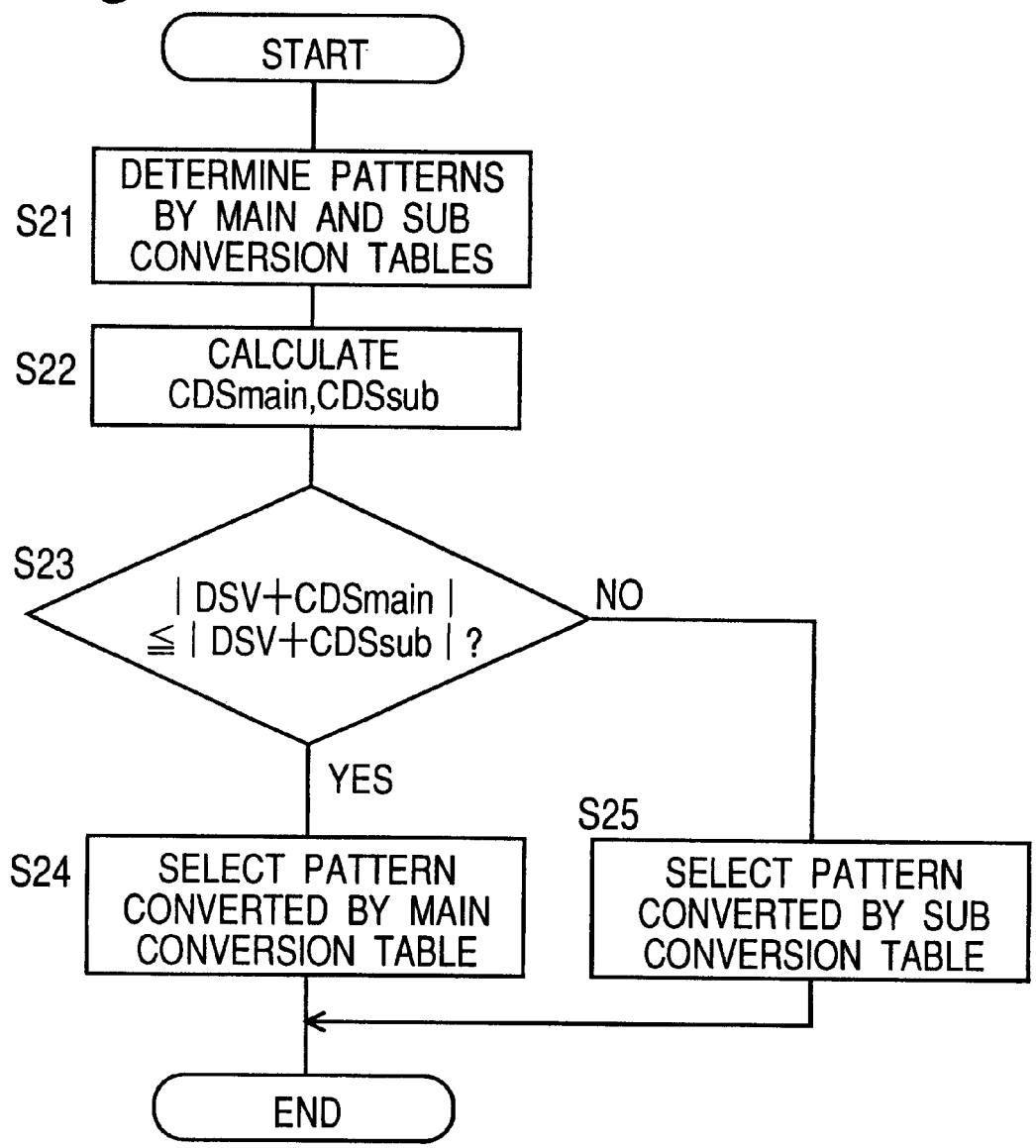
FIG. 6 is a flowchart for DC component suppress control for 8–16 modulation in the postamble area.

The DC component suppress process for the 8–16 modulation in the postamble area 14g is described next with reference to a flowchart shown in FIG. 6. This process follows the aforementioned DC component suppress process in the data recording area 14z (shown in the flowchart of FIG. 4). Accordingly, the value of the DSV used in this process is equal to the final value of the DSV obtained in the process of FIG. 4 (i.e. the cumulative value of the DSV for the area before the postamble area 14g in the sector).

First, the postamble patterns are determined by using respectively the main conversion table and the sub conversion table shown in FIG. 5 with reference to the next state of the code word recorded in the last region of the last data area 14y in the data recording area 14z (S21).

Then, the value of $CDS_{main}$ in and the value of $CDS_{sub}$ are respectively calculated (S22). The $CDS_{main}$ is calculated by the result of the NRZI conversion of the postamble pattern determined with the main conversion table. The $CDS_{sub}$ is calculated by the result of the NRZI conversion of the postamble pattern determined with the sub conversion table. In this process, the run length rule is not decided because the postamble pattern shown in FIG. 5 is made so as to always keep the run length limitation.

The absolute value of the value obtained by adding the $CDS_{main}$ to the DSV is compared with the absolute value of the value obtained by adding the $CDS_{sub}$ to the DSV (S23). When the absolute value obtained by adding the $CDS_{main}$ to the current DSV is not more than the absolute value obtained by adding the $CDS_{sub}$ to the current DSV ("YES" in step S23), the postamble pattern determined by the main conversion table is selected (S24). Otherwise ("NO" in step S23), the postamble pattern determined by the sub conversion table is selected (S25).

Thus, in the optical disk of this invention, the information bits required for demodulation of the final data can be obtained from the data pattern recorded in the postamble area 14g. By employing 16 bits at the front of the sync code as the postamble pattern, the run length limitation is satisfied at the connection between the postamble pattern and the final code word recorded in the last region of the data recording area 14z. Furthermore, As shown in the flowcharts of FIGS. 4 and 6, the process for the postamble area 14g may be obviously included in the process for the sync area $14e_i$. Hence, it does not need to be provided the dedicated control or device for the postamble area 14g.

Figure 7:
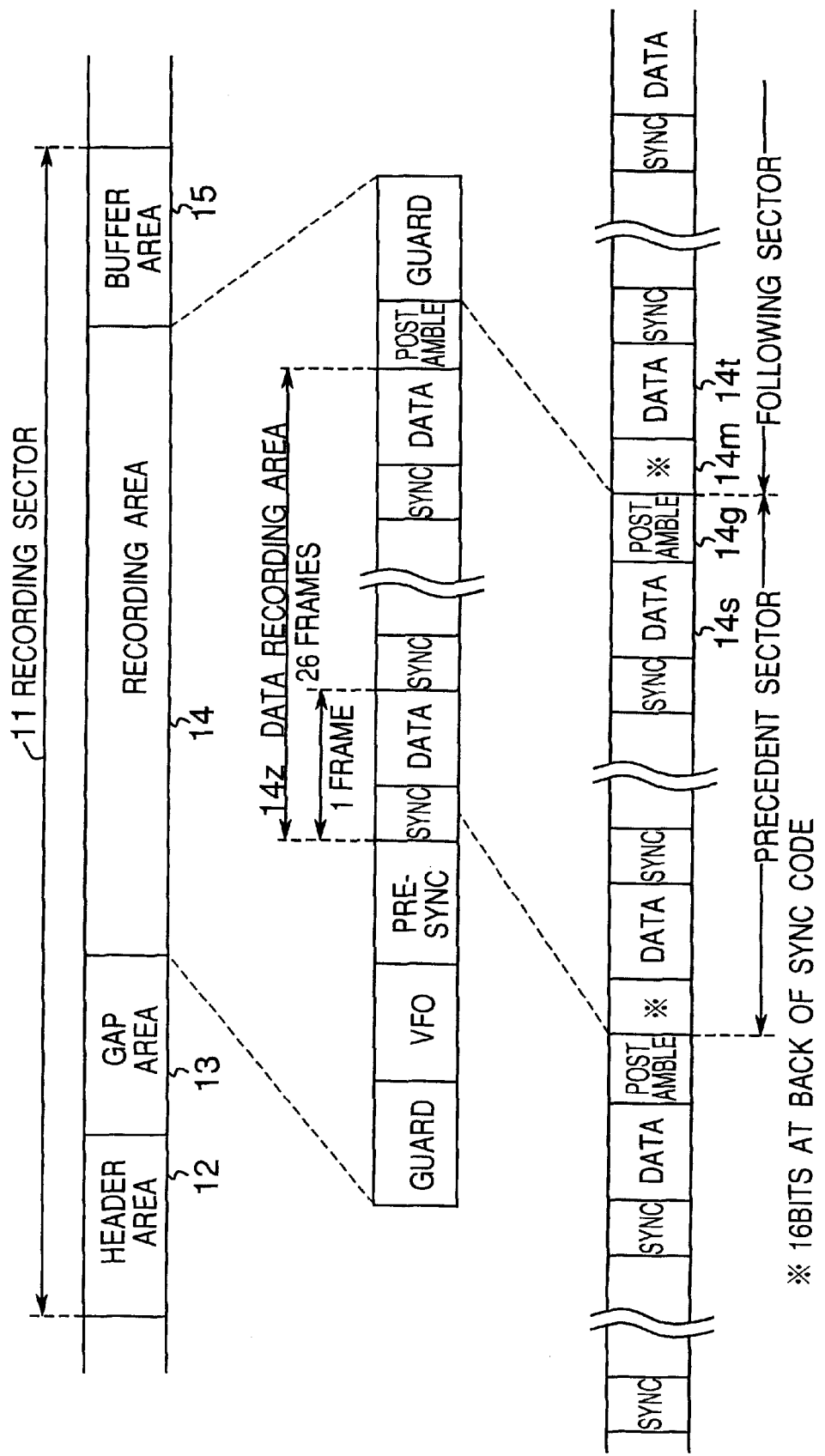
FIG. 7 is a diagram showing the connection between sectors of the optical disk of the present invention.

The following advantages are also obtained by using 16 bits at the front of the sync code as the postamble pattern in the case where the sync area and the data area are extracted sector by sector and are connected in order to be used continuously as shown in FIG. 7. In this case, data pattern in the final postamble area 14g of the precedent sector is used instead of 16 bits at the front of the first sync area in the following sector. Hereby the synchronization information for the data area 14t of the following sector is obtained from the data pattern of the postamble area 14g and 16 bits (14m) of the front of the sync area at the connection between both sectors. The final data of the data area 14s in the precedent sector can be demodulated by the data pattern in the postamble area 14g. Accordingly, it allows accurate demodulation even in the case where the sync area and the data area are extracted and are connected between sectors to be used continuously as shown in FIG. 7.

It is also noted that the postamble pattern may include all bits of the sync code instead of a part (16 bits) of the sync code.

(Second Embodiment)

Figure 8:
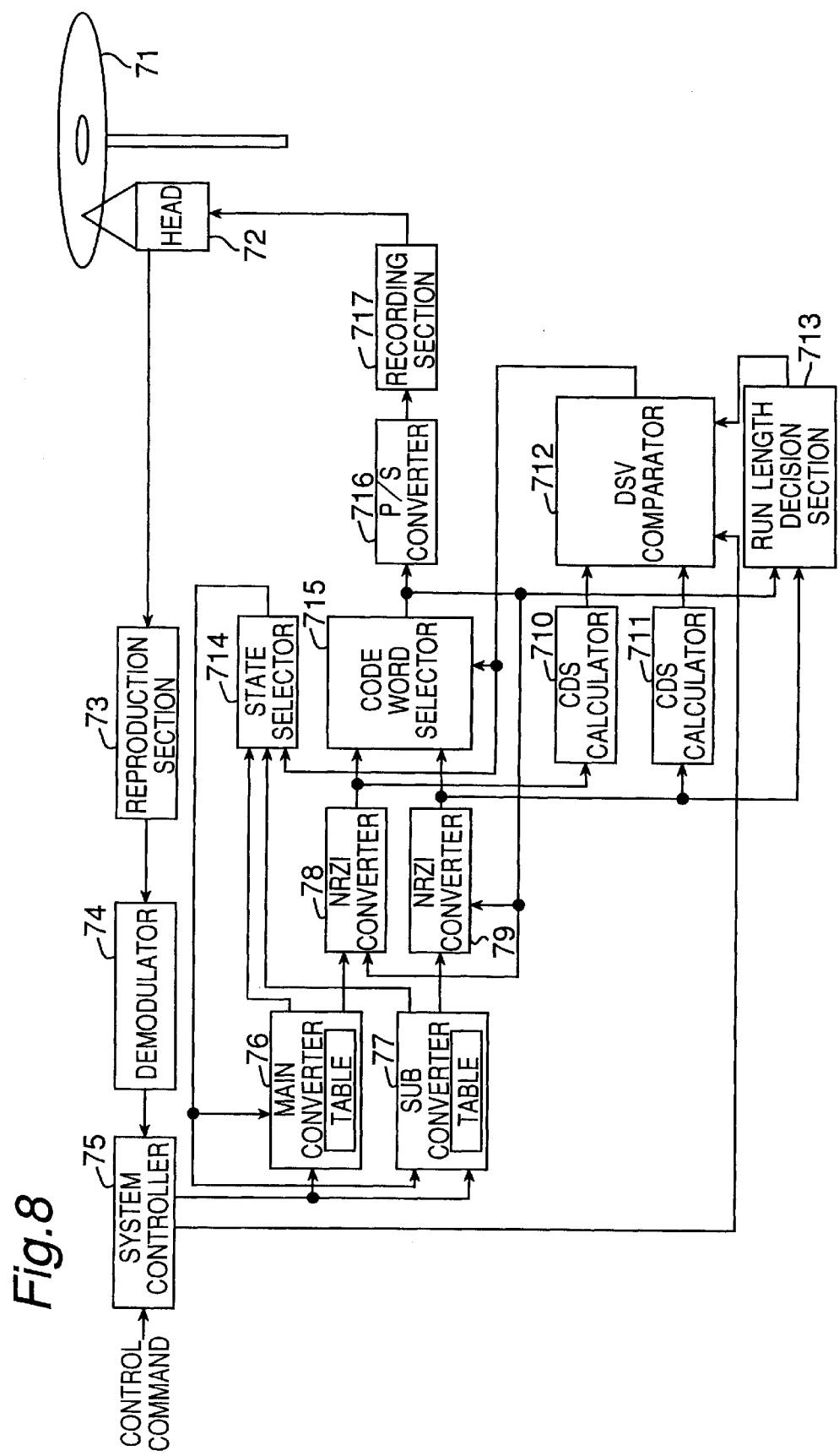
FIG. 8 is a block diagram of an optical disk apparatus in a second embodiment of the present invention.

FIG. 8 is a block diagram of an optical disk apparatus of the present invention.

In FIG. 8, the optical disk apparatus comprises a head 72, a reproduction section 73, a demodulator 74, a system controller 45, a main converter 76, a sub converter 77, NRZI converters 78 and 79, CDS calculators 710 and 711, a DSV comparator 712, a run length decision section 713, a state selector 714, a code word selector 715, a parallel/serial (P/S) converter 716 and a recording section 717.

The optical disk apparatus of the embodiment records and reproduces the data to/from the optical disk 71 formatted in the sector format of the first embodiment shown in FIG. 1. In the header area 12, however, a predetermined address is recorded in advance, and this optical disk apparatus records data in the recording area 14.

Information recorded in the optical disk 71 is read out as a analog modulated signal obtained from a reflection light of a laser beam emitted to the optical disk 71 by the head 72. The analog modulated signal is converted to digital signal which is extracted as a reproduction signal in the reproduction section 73.

Using the reproduction signal obtained from the optical disk 71 via the head 72 and the reproduction section 73, the demodulator 74 outputs the address information and the position information indicating a position in the recording sector to the system controller 75.

The system controller 75, following control commands from external circuitry, outputs various control signals comprising a VFO gate, a pre-sync gate, a sync gate, a data gate, a guard gate and a postamble gate. Those signals are corresponding to the predetermined area in the data recording area with the predetermined address. Each gate signal controls process for generating data pattern in predetermined area of the data recording area 14.

The main converter 76 and the sub converter 77 have a plurality of internal conversion tables. These conversion tables includes tables shown in FIGS. 2, 3 and 5. The main converter 76 and the sub converter 77 output a VFO pattern when the VFO gate is enabled, a pre-sync pattern when the pre-sync gate enabled, and a guard data pattern when the guard gate enabled, respectively.

The main converter 76 and the sub converter 77 output sync codes and next states (next state=1) converted by using the main conversion table and the sub conversion table shown in FIG. 3 when the sync gate is enabled.

The main converter 76 and the sub converter 77 output code words and next states converted by using the main conversion table and the sub conversion table shown in FIG. 2 when the data gate is enabled.

The main converter 76 and the sub converter 77 respectively output 16 bits at the front of the sync codes with sync number SYO, which are determined by using the main conversion table and the sub conversion table shown in FIG. 5 when the postamble gate is enabled.

For the purpose of simplicity of explanation, the sync code, code word or postamble pattern output from the main converter 76 is called "main conversion code" and the next state output from the main converter 76 is called "main conversion state", while the sync code, code word or postamble pattern output from the sub converter 77 is called "sub conversion code" and the next state output from the sub converter 77 is called "sub conversion state".

The NRZI converter 78 and 79 perform NRZI conversion of the main conversion code and the sub conversion code.

The CDS calculators 710 and 711 calculate the CDSs from the output of the NRZI converters 78 and 79, and output the results of these calculations as $CDS_{main}$ and $CDS_{sub}$, respectively.

The run length decision section 713 decides whether or not the run length at the data connections satisfies the run length limitation with 2 bits for the minimum inverted bit interval $T_{min}$ and 10 bits for the maximum inverted bit interval $T_{max}$. The run length decision section 713 outputs "H (High level signal)" when the limitation is satisfied and "L (Low level signal)" when it is not satisfied.

The DSV comparator 712, after taking the DSV total up until the current point as $DSV_{total}$, outputs "L" when the absolute value of the sum $DSV_{total}+CDS_{main}$ is not larger than the absolute value of the sum $DSV_{total}+CDS_{sub}$, and the output of the run length decision section is "H", and then sets the $DSV_{total}$ to $DSV_{total}+CDS_{main}$. In all other cases, the DSV comparator 712 outputs "H" and sets $DSV_{total}$ to $DSV_{total}+CDS_{sub}$. The value of $DSV_{total}$ is reset to zero at the fall down of the VFO gate signal output from the system controller 75.

The state selector 714 outputs the main conversion state as the next state when the output from the DSV comparator 712 is "L", or outputs the sub conversion state when that output is "H". The next state from the state selector 714 is fed into the main converter 76 and the sub converter 77 respectively to be used for selecting the next conversion tables.

The code word selector 715 selects the output of the NRZI converter 78 when the output of the DSV comparator 712 is "L", or selects the output of the NRZI converter 79 when that output is "H". That is, the code word selector 715 outputs the sync code, the code word or the postamble pattern obtained by the conversion table by which the value of the DSV becomes smaller. Thus, it is possible to suppress the DC component of the NRZI signal.

The parallel/serial converter 716 converts the output from the code word selector 715 into serial data, and outputs the serial data to the recording section 717. The recording section 717 receives the serial data, generates optical modulated signal from the received serial data, and records data on the optical disk 71 using the modulated signal via the head 72.

Consequently, this optical disk apparatus, as described in the foregoing, can record data to the optical disk with the sector format described in the first embodiment.

(Third Embodiment)

Figure 9:
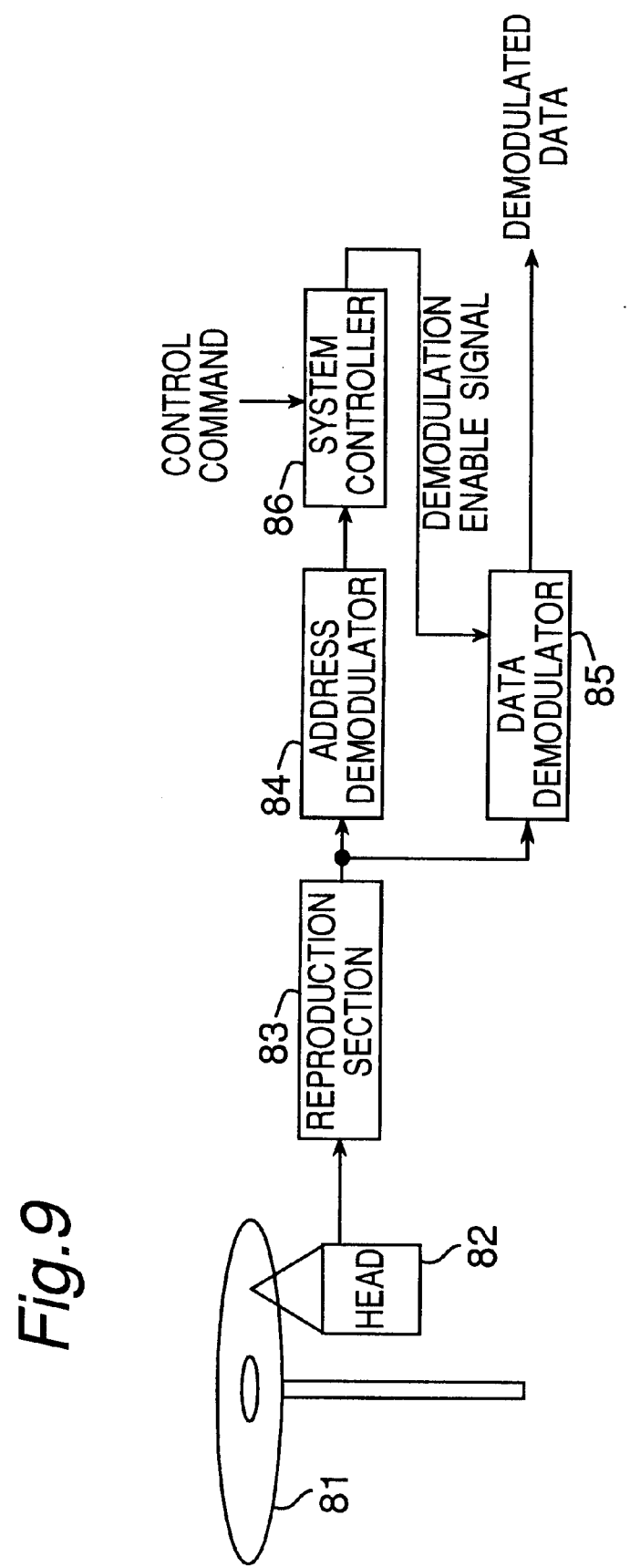
FIG. 9 is a block diagram of an optical disk apparatus in a third embodiment of the present invention.

FIG. 9 is a block diagram of another optical disk apparatus according to the present invention.

The optical disk apparatus reproduces data from the optical disk with a first format and a second format. The first format is the format shown in FIG. 1 or 10A. The second format is the format shown in FIG. 11. In the first format, 26 frames of area is provided between the header area and the buffer area, while in the second format, there is no the header area and the buffer area and the frame area is provided continuously.

In FIG. 9, the optical disk apparatus comprises a head 82, a reproduction section 83, an address demodulator 84, a data demodulator 85 and a system controller 86.

The operation of this optical disk apparatus for reproducing data from the optical disk with the second format is described below.

Information recorded in the optical disk 81 is read out as a analog modulated signal obtained from a reflection light of a laser beam emitted to the optical disk 81 by the head 82. The analog modulated signal is converted to digital signal which is output as a reproduction signal from the reproduction section 83.

The system controller 86 receives address information indicating area to be reproduced in a control command from external circuitry. Using the reproduction signals obtained from the reproduction section 83, the address demodulator 84 outputs the address information and the position information indicating the position in the recording sector to the system controller 86.

Figure 10A:
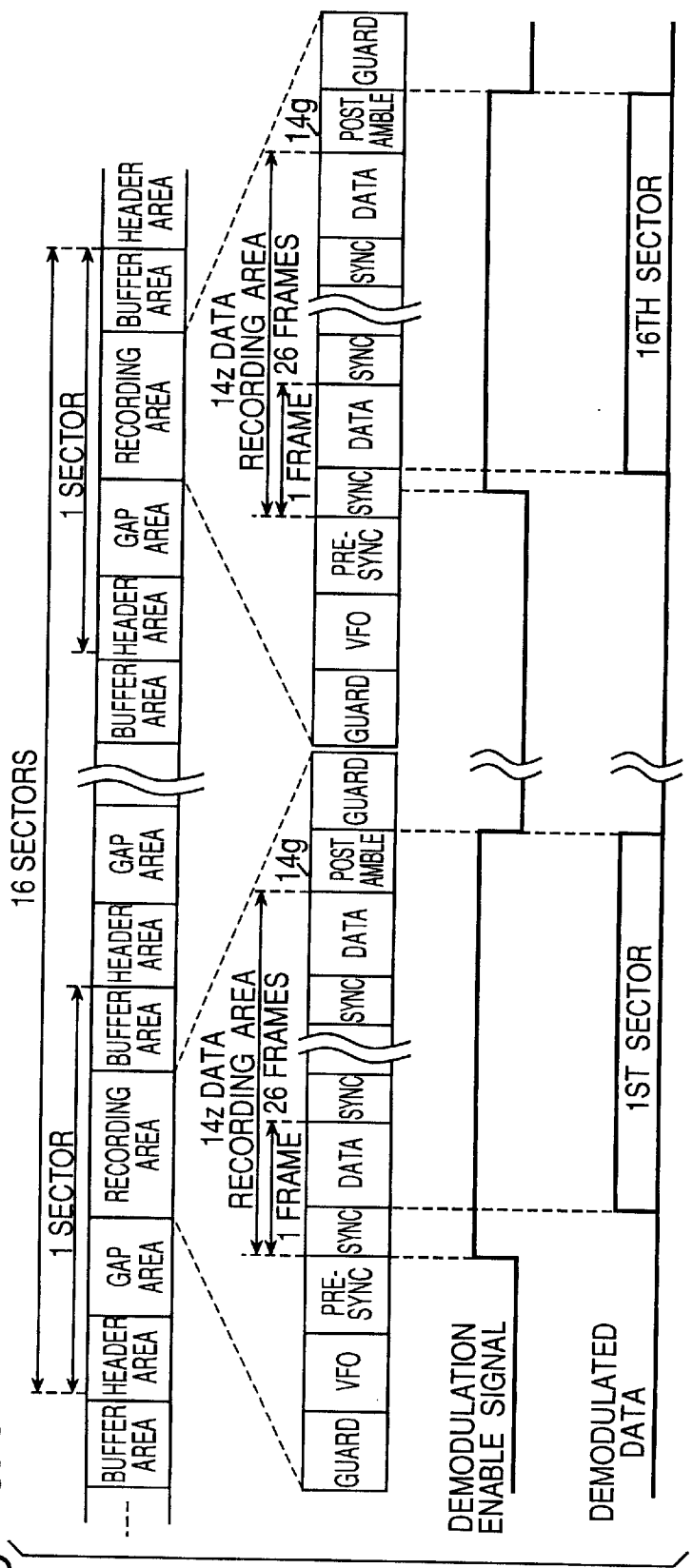
FIG. 10A is a diagram for explaining of the sector structure of the first sector format for the optical disk apparatus in the third embodiment of the present invention, a timing chart of the demodulation enable signal and a timing chart of the demodulated data.

The system controller 86 compares the address indicated by the received control command with the address from the address demodulator 84. The system controller 86 outputs a demodulation enable signal when the addresses are matched. The demodulation enable signal becomes "H" from the first bit of the first sync SYO to the end of the postamble area 14g for the first sector, or is "H" from the 17th bit of the first sync SYO to the end of the postamble area 14g for sectors after the first sector. For example, the demodulation enable signal is shown in FIG. 10A in the case of reproducing data in continuous 16 sectors due to the control command indicating the address for continuous 16 sectors. Thus, the system controller 86 detects the sync area and the data area, and outputs the demodulation enable signal when it detects them.

The data demodulator 85 operates only when the demodulation enable signal is "H", demodulates the reproduction signals from the reproduction section 83, and outputs demodulated data at the timing shown in FIG. 10A.

In the first format, the data pattern of the postamble area is equal to 16 bits at the front of the leadoff sync SYO.

Figure 10B:
FIG. 10B is a diagram showing data pattern at the connection between the sectors extracted by the optical disk apparatus in the third embodiment of the present invention.
Figure 12:
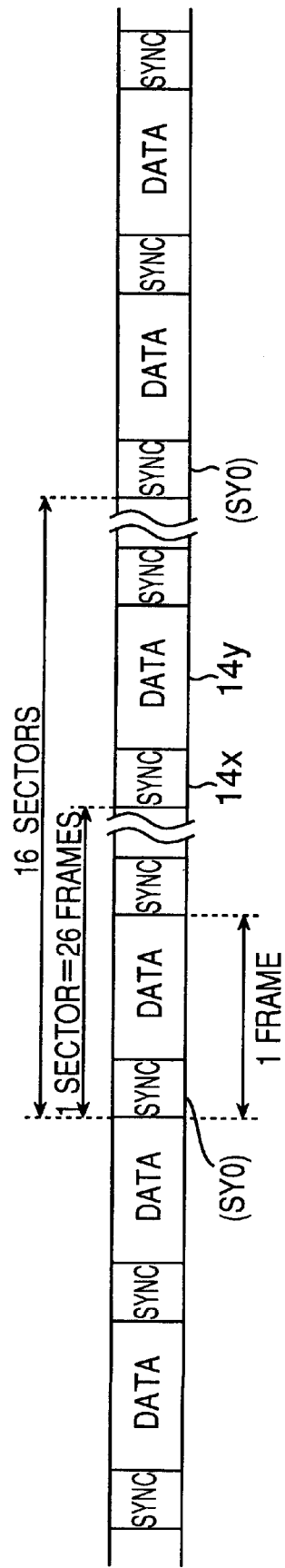
FIG. 12 is a diagram of the sector structure in an optical disk in the prior art.

Hence, when continuous sectors are read, a combination of the postamble pattern (16 bits) and 16 bits at the back of the leadoff sync SYO of the sector at the sector connection provides data pattern equal to the leadoff sync SYO, as shown in FIG. 10B. Using this data pattern, the data demodulator 85 can obtain the synchronization information to read sectors continuously. The data demodulator 85 can reproduce data from the optical disk 81 with either of the first format and the second format. Thus, in the data demodulator 85 does not need to change the operation according to the sector format of the optical disk 81.

Consequently, the optical disk apparatus of this embodiment described above, is able to employ common circuitry for the first format and the second format of the optical disk in order to reduce the circuit volume.

According to the invention, the postamble are is provided immediately after the data recording area of the sector in the optical disk. The data pattern in the postamble pattern is a part or entire of the data pattern for synchronization. Thus, the accurate demodulation is carried out at the connection using data pattern in the postamble area as synchronization information instead of the leading synchronization signal when the recording area is extracted to be combined between sectors.

Furthermore, a stable operation of the optical disk apparatus is achieved since data pattern in the postamble area is selected so that the DSV becomes smaller.

Furthermore, in the postamble area, the information required for demodulation of the final modulated code in the sector is recorded. Thus, it is possible to obtain the information to demodulate the final modulated code of the sector when recording and reproduction need to be performed by the sector in the optical disk divided into a plurality of sectors which have some predetermined areas other than the data recording area. Therefore, it is possible to reproduce data from the optical disk with the format which includes areas for sector identification, a laser power calibration or the like other than the data recording area and thereby the data recording areas are provided discontinuously between some sectors.

Although the present invention has been described in connection with specified embodiments thereof, many other modifications, corrections and applications are apparent to those skilled in the art. Therefore, the present invention is not limited by the disclosure provided herein but limited only to the scope of the appended claims.

What is claimed is:

1. A data recording medium having a region for recording data, said region having a plurality of sectors, each sector comprising:
   a data recording area to store a plurality of modulated codes obtained by modulating said data; and
   a postamble area located immediately after said data recording area, said postamble area storing a data pattern,
   wherein said data recording area stores a plurality of synchronization patterns to be used for synchronizing, and said data pattern stored in the postamble area includes at least a part of the synchronization pattern.

2. The data recording medium according to claim 1, wherein said data pattern stored in the postamble area is selected from a plurality of predetermined patterns so that a value of DSV becomes minimum, said value of DSV being calculated for said pattern accompanied with data in said data recording area.

3. The data recording area according to claim 2, wherein said data pattern stored in the postamble area is a pattern which satisfies the run length limitation at the connection between said data pattern stored in the postamble area and the final modulated code in said data recording area.

4. The data recording medium according to claim 1, wherein said data pattern stored in the postamble area is a pattern which satisfies the run length limitation at the connection between said data pattern stored in the postamble area and the final modulated code in said data recording area.

5. The data recording medium according to claim 1, wherein said data pattern stored in the preamble area includes information to demodulate the final modulated code stored in the data recording area.

6. A data recording medium having a region for recording data, said region having a plurality of sectors, each sector comprising:
   a data recording area to store a plurality of modulated codes obtained by modulating said data; and
   a postamble area located immediately after said data recording area, said postamble area storing a data pattern,
   wherein said data pattern stored in the postamble area is selected from a plurality of predetermined patterns so that a value of DSV of the pattern becomes minimum, said value of DSV being calculated for said pattern accompanied with data in said data recording area.

7. The data recording area according to claim 6, wherein said data pattern stored in the postamble area is a pattern which satisfies the run length limitation at the connection between said data pattern stored in the postamble area and the final modulated code in said data recording area.

8. The data recording medium according to claim 6, wherein said data pattern stored in the preamble area includes information to demodulate the final modulated code stored in the data recording area.

9. A data recording medium having a region for recording data, said region having a plurality of sectors, each sector comprising:
   a data recording area to store a plurality of modulated codes obtained by modulating said data; and
   a postamble area located immediately after said data recording area, said postamble area storing a data pattern,
   wherein said data pattern stored in the postamble area is a pattern which satisfies the run length limitation at the connection between said data pattern stored in the postamble area and the final modulated code in said data recording area.

10. The data recording medium according to claim 9, wherein said data pattern stored in the preamble area includes information to demodulate the final modulated code stored in the data recording area.

11. A data recording apparatus for recording data in the form of modulated codes to a data recording medium, the data recording medium having a region for recording data, said region having a plurality of sectors, each sector including a data recording area to store a plurality of modulated codes obtained by modulating said data, said data recording apparatus comprising:
   a pattern generator to generate at least one data pattern including at least a part of a synchronization pattern to be used for synchronizing; and
   a recording unit to record one of the data patterns from said pattern generator in the area immediately after said data recording area.

12. The data recording apparatus according to claim 11, wherein each of said data patterns from the pattern generator includes information to demodulate the final modulated code stored in said data recording area.

13. The data recording apparatus according to claim 11, further comprising:
   a DSV calculator to calculate the DSV for each of the data patterns from said data pattern generator; and
   a selector to select one of the data patterns based on the DSV calculated by said DSV calculator,
   wherein said recording unit records the data pattern selected by said selector into the area immediately after the data recording area.

14. The data recording apparatus according to claim 11, further comprising
   a run length decision unit to decide whether or not said data pattern satisfies the run length limitation at the connection between said data pattern and the final modulated code in said data recording area, and
   a selector to select one of the data patterns based on the result of decision by said run length decision unit so that the run length limitation is satisfied,
   wherein said recording unit records the data pattern selected by said selector into the area immediately after the data recording area.

15. A data reproducing apparatus for reproducing data from a data recording medium, the data recording medium having a region for recording data, said region having a plurality of sectors, each sector including a data recording area and a postamble area located immediately after said data recording area, said data recording area including a sync area storing synchronization pattern to be used for synchronizing and a data area storing modulated data obtained by modulating said data, said postamble area storing a data pattern including a part of said synchronization pattern, said data reproducing apparatus comprising:
   a reproducing unit to read out data from said recording medium in the form of analog modulated signal, and to convert said analog modulated signal into digital data;
   a area detector to detect said sync area and said data area based on said digital data, and to generate a predetermined control signal while said sync area and said data area are detected; and
   a demodulator to demodulate said digital data form said reproducing unit while said area detector generates said control signal.

16. A data recording method for recording data in the form of modulated codes to a data recording medium, the data recording medium having a region for recording data, said region having a plurality of sectors, each sector including a data recording area to store a plurality of modulated codes obtained by modulating said data, said data recording method comprising:
   generating at least one data pattern including at least a part of synchronization pattern to be used for synchronizing; and
   recording one of said generated data patterns in the area immediately after said data recording area.

17. The data recording method according to claim 16, wherein each of said generated data patterns includes information to demodulate the final modulated code stored in said data recording area.

18. The data recording method according to claim 16, further comprising calculating the DSV for each of said generated data patterns, and selecting one of the data patterns based on the calculated DSV, wherein said selected data pattern is recorded into the area immediately after the data recording area.

19. The data recording method according to claim 16, further comprising deciding whether or not said data pattern satisfies the run length limitation at the connection between said data pattern and the final modulated code in said data recording area, and selecting one of the data patterns based on the result of said decision so that the run length limitation is satisfied, wherein said selected data pattern is recorded into the area immediately after the data recording area.

20. A data reproducing method for reproducing data from a data recording medium, the data recording medium having a region for recording data, said region having a plurality of sectors, each sector including a data recording area and a postamble area located immediately after said data recording area, said data recording area including a sync area storing a synchronization pattern to be used for synchronizing and a data area storing modulated data obtained by modulating said data, said postamble area storing a data pattern including a part of said synchronization pattern, said data reproducing method comprising:
   reading out data from said recording medium in the form of analog modulated signal;
   converting said analog modulated signal into digital data;
   detecting said sync area and said data area based on said digital data,
   generating a predetermined control signal while said sync area and said data area are detected; and
   demodulating said digital data while said control signal is being generated.

* * * * *